United States Patent
Sharpe

(10) Patent No.: US 8,038,383 B2
(45) Date of Patent: Oct. 18, 2011

(54) VERTICAL AXIS TURBINE APPARATUS

(75) Inventor: David John Sharpe, Essex (GB)

(73) Assignee: Wind Power Limited, Suffolk (GB)

( * ) Notice: Subject to any disclaimer, the term of this patent is extended or adjusted under 35 U.S.C. 154(b) by 809 days.

(21) Appl. No.: 11/791,032

(22) PCT Filed: Nov. 17, 2005

(86) PCT No.: PCT/GB2005/004443
§ 371 (c)(1),
(2), (4) Date: May 18, 2007

(87) PCT Pub. No.: WO2006/054091
PCT Pub. Date: May 26, 2006

(65) Prior Publication Data
US 2008/0152495 A1 Jun. 26, 2008

(30) Foreign Application Priority Data

Nov. 18, 2004 (GB) ................... 0425441.3
Jun. 28, 2005 (GB) ................... 0513170.1

(51) Int. Cl.
*F03D 3/06* (2006.01)
(52) U.S. Cl. .................... 415/4.2; 415/4.4; 415/129
(58) Field of Classification Search .............. 415/4.2, 415/4.4, 126, 907, 129; 416/132 B, 210 R, 416/244 R; 290/44, 55
See application file for complete search history.

(56) References Cited

U.S. PATENT DOCUMENTS

| 4,105,363 | A | * | 8/1978 | Loth | 416/41 |
| 4,255,085 | A | * | 3/1981 | Evans | 416/197 A |
| 4,264,279 | A | * | 4/1981 | Dereng | 416/227 A |
| 4,355,956 | A | | 10/1982 | Ringrose et al. | |
| 4,456,429 | A | * | 6/1984 | Kelland | 416/117 |
| 5,570,859 | A | * | 11/1996 | Quandt | 244/213 |
| 6,068,446 | A | * | 5/2000 | Tangler et al. | 416/223 R |

FOREIGN PATENT DOCUMENTS

| GB | 2 175 350 A | | 11/1986 |
| GB | 2 175 351 A | | 11/1986 |
| GB | 2402109 A | * | 12/2004 |
| IT | 1 196 313 B | | 11/1988 |

OTHER PUBLICATIONS

A. J. Robotham et al: "Control of the 'V' Type Vertical Axis Wind Turbine by Blade Tip Control", Proceedings of the BWEA Wind Energy Conference (British Wind Energy Association), 8th; Wind Energy Conversion 1986, Proceedings of the 8th British Wind Energy Association Conference; Cambridge, England), 1996, pp. 279-286, XP008058967, London.
G. A. Boyle et al: "The Taylor ?V? Type Vertical Axis Wind Turbiner Current Status", Windpower '85, 1985, pp. 429-433, XP008058965.

* cited by examiner

*Primary Examiner* — Ninh H Nguyen
(74) *Attorney, Agent, or Firm* — Breiner & Breiner, L.L.C.

(57) ABSTRACT

Vertical axis turbine apparatus is described in which a rotating blade turbine member mounted on a fixed base includes one to fifty, preferably two or three, upwardly and outwardly inclined spars. On each spar is set at least one aerofoil or hydrofoil section blade. If there is more than one spar, the spars are preferably held to one another via a plurality of guy wires.

20 Claims, 4 Drawing Sheets

VERTICAL AXIS TURBINE APPARATUS

This invention relates to vertical axis turbine apparatus particularly, though not exclusively, for power generation.

It has been known for centuries that energy may be derived from the wind. Windmills were a familiar feature of the medieval landscape in many countries and, even today, are in use around the world in various capacities. One particular use of wind driven turbines is to generate electricity.

With the rise in concern about the depletion of fossil fuels, and possible adverse environmental effects caused by their use, interest has revived in the possibility of electricity generation via wind turbines, particularly for such generation on a large scale.

So-called "wind farms" have been built in many countries with a view to harvesting wind energy in this way. They generally consist of an array of towers, each of which carries at its upper end a swivellable head, allowing alignment with the wind direction, on which is mounted a number of turbine blades all joined to a single rotating hub, like propeller blades, but being driven by the wind rather than by a motor to produce forward thrust as would be a propeller. There is a substantial amount of published literature relating to such horizontal axis wind turbine apparatus.

Although commercial power generation using such apparatus has commenced, there is concern about the unsightliness they cause to some observers when sited in rural landscapes. Erecting wind turbines off-shore reduces the unsightliness and removes objections to the sheer size and numbers of the apparatus. Increasing the size of off-shore wind turbines reduces the cost of electrical connection to shore by reducing the number of wind turbines necessary to provide a given amount of power.

A limit to the size of the horizontal axis wind turbine apparatus is encountered in the fatigue damage (as in "metal fatigue") suffered by the repeated reversal of bending of the blades caused by their weight as the blades rotate; the fatigue damage caused by the weight of a blade increases proportionately with the size of the blade, assuming no other alterations in design are made. As the size of a blade gets greater the designer is forced to employ different materials that have superior fatigue resistance but which are usually more expensive and reduce the cost-effectiveness of the apparatus.

Wind turbine apparatus in which the blades rotate about a vertical axis do not experience bending reversal caused by weight but they do experience fatigue damage caused by wind pressure loading. However, wind pressure fatigue does not increase with the size of the so-called vertical axis wind turbine apparatus and so does not impose a limit to its size.

A number of suggestions have been made in the past to generate electricity using vertical axis wind turbines. There is a substantial amount of literature relating to the so-called Savonius and Darrieus designs, and practical power-generating units have been built. However, being less well developed, they have not found favour with operators of commercial wind farms. The lack of development of the vertical axis wind turbine is because of a perceived lesser efficiency of operation compared with the horizontal axis turbine.

GB-A-2102079 describes a vertical axis wind turbine with the possibility of twin blades inclined upwards to the horizontal plane at a selectable angle and attached at the lower ends to a shaft that permits rotation about a vertical axis. It is not believed that this design has led to any commercial exploitation. The design has the disadvantage of generating a wind pressure force that causes an excessive overturning, or toppling moment to the whole apparatus. The cost of resisting the toppling moment is uneconomical.

GB-A-2303409 discloses a similar vertical axis wind turbine consisting of a single, balanced inclined blade rotating about a vertical axis that can rock under the action of wind pressure but against the resistance of a balancing mass. This design reduces the toppling moment but requires a blade and balancing masses that are uneconomically heavy.

Turbine apparatus for extracting power from flowing water is also known, from the mediaeval watermill to more modern designs of turbine for mounting underwater to extract power from water flow, so-called hydroelectric power generation.

We have now discovered a new class of designs for vertical axis turbines that can be scaled up to a size that exceeds that which is economically feasible for horizontal axis turbines, which can be used as wind turbines, on land or off shore, or underwater to extract power from flowing currents.

According to the present invention, in its broadest aspect, there is provided a vertical axis turbine including a fixed base and a rotating bladed turbine member mounted on the fixed base and rotatable about a vertical axis, the bladed member consisting of at least one inclined elongate spar inclined upwardly and outwardly from the axis of rotation, the or each spar carrying set on it at least one short aerofoil or hydrofoil section blade. Preferably the angle(s) of the short aerofoil or hydrofoil section blade(s) relative to the spar(s) is/are adjusted to optimise the overall rotational couple about the vertical axis and to minimise the overall overturning moment when subjected to wind or current loading. The angle does not have to be the same for all of the blades when there is more than one. The elongate spar(s) which serve(s) as structural support for the aerofoil or hydrofoil section(s), must necessarily incur loading in their own right, and accordingly preferably have an aerofoil or hydrofoil section to minimise drag.

Preferably the number of spars is 2 or 3 though up to 50 spars may be provided if desired. If there is more than one spar, the spars are preferably held together by a plurality of guy wires or the like connecting each spar to the opposite or adjacent spars. The angle of inclination of each spar to the vertical may be adjustable, e.g. by hinging each spar at its base and by shortening or lengthening the guy wire(s). Preferably the number of short aerofoil or hydrofoil sections is between 1 and 20, more preferably 2 to 5, and most preferably 4.

The aerofoil or hydrofoil profiles of the blade(s) and spar(s), i.e. their section from leading edge to trailing edge may vary in their classification, thickness-to-chord ratio and camber. For wind turbines, the aerodynamic profile of the blades preferably has a maximum thickness to chord ratio in the range 10% to 50%.

The aspect ratio of each short aerofoil or hydrofoil section blade is preferably in the range 2 to 5 but most preferably in the range 3 to 4.

The angle of mounting of the short aerofoil or hydrofoil section blades on the or each spar, measured from the radially outward horizontal direction in the radial and vertical plane containing the centre-line of the spar, is preferably in the range of 90 degrees to 160 degrees but most preferably around 145 degrees.

The angle of mounting of each short aerofoil or hydrofoil section blade to a spar measured from a horizontal line perpendicular to the radial and vertical plane containing the centre-line of the spar in a normal cross-sectional plane of the short blade, i.e the angle of pitch, is preferably in the range +5 degrees to −5 degrees. The angles of mounting may be the same for each blade or different The angle should be adjusted to maximise the efficiency of the turbine to harvest energy from the wind or water current, but it may also be possible to use such angular adjustments for other purposes. For example, by changing the angle of pitch of one or more of the short aerofoil or hydrofoil section blades in a progressive manner, by up to 90 degrees, an aerodynamic or hydrodynamic braking effect may be achieved. This can be of value in enabling control to be effected, e.g. to limit power output in very windy or high flood current situations. Also, one or more of the short aerofoil or hydrofoil section blades may incorporate means to rotate the rearmost portion about a span-wise hinge like an aileron, cyclically, within the range of +90 degrees to −90 degrees in order to maximise the power output of the turbine.

The size of the turbines in accordance with the present invention may vary substantially, naturally larger sizes being capable of generating greater power. The typical sizes for a wind turbine with a design capacity of 1 megawatt would be a circle of 100 meters diameter swept out horizontally by the outer tip of a spar and blades of spanwise length 16 meters and chord length 5.5 meters.

The structure of the vertically inclined spars may vary widely and may be simple, i.e. a single central spar running upwardly and outwardly, or it may be complex, for example a number of sub spars constituting a framework serving to mount the individual short aerofoil or hydrofoil section blades. Preferably the cross-section of the spars and, indeed, any other members such as support struts or ties associated therewith, is an aerofoil or hydrofoil section in order to minimise drag. Within these constraints, a wide variety of designs may be adopted.

The invention is illustrated by way of example in more detail with reference to the accompanying diagrammatic drawings in which.

Figure 1:
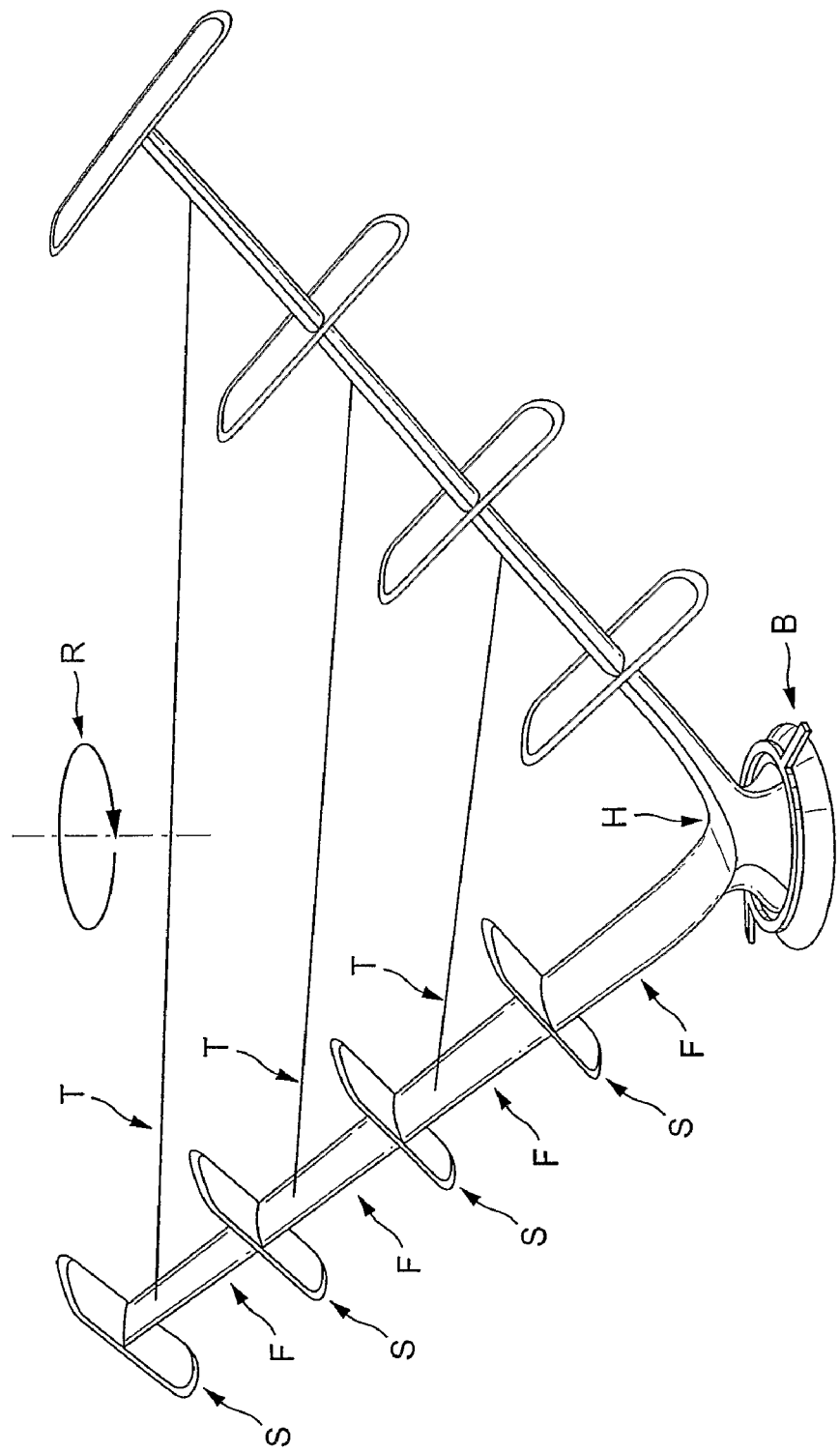
FIG. 1 is a perspective view of a vertical axis wind turbine apparatus in accordance with the invention.
Figure 2:
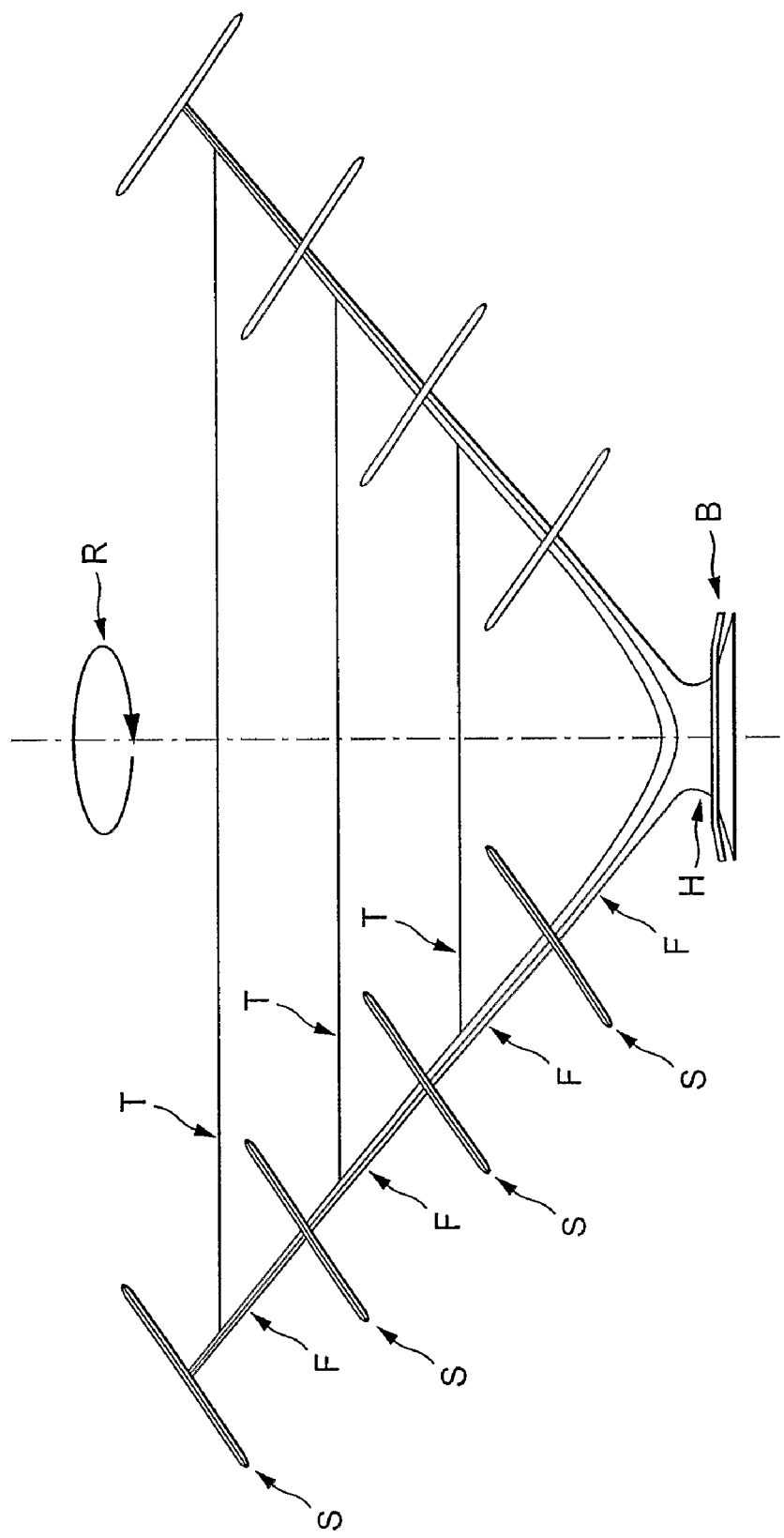
FIG. 2 is a vertical axial section of the apparatus shown in FIG. 1.

Referring first to FIGS. 1 and 2, these show a wind turbine apparatus with two arms F comprising single spars supporting short aerofoil section blades S connected by guys T.

The two spars F come together at their base in a hub H which is rotatably set on a base B. When the wind blows, the assembly of the arms F, blades S and guys T rotates about a vertical axis on the base B and by means of a suitable shaft can drive generator apparatus of appropriate type, either via gearing, or preferably directly. The overall size of the turbine apparatus shown in FIGS. 1 and 2 may vary widely, the larger the size the greater the engineering outlay, but, likewise, the greater the amount of power which can be generated by its rotation.

Figure 3:
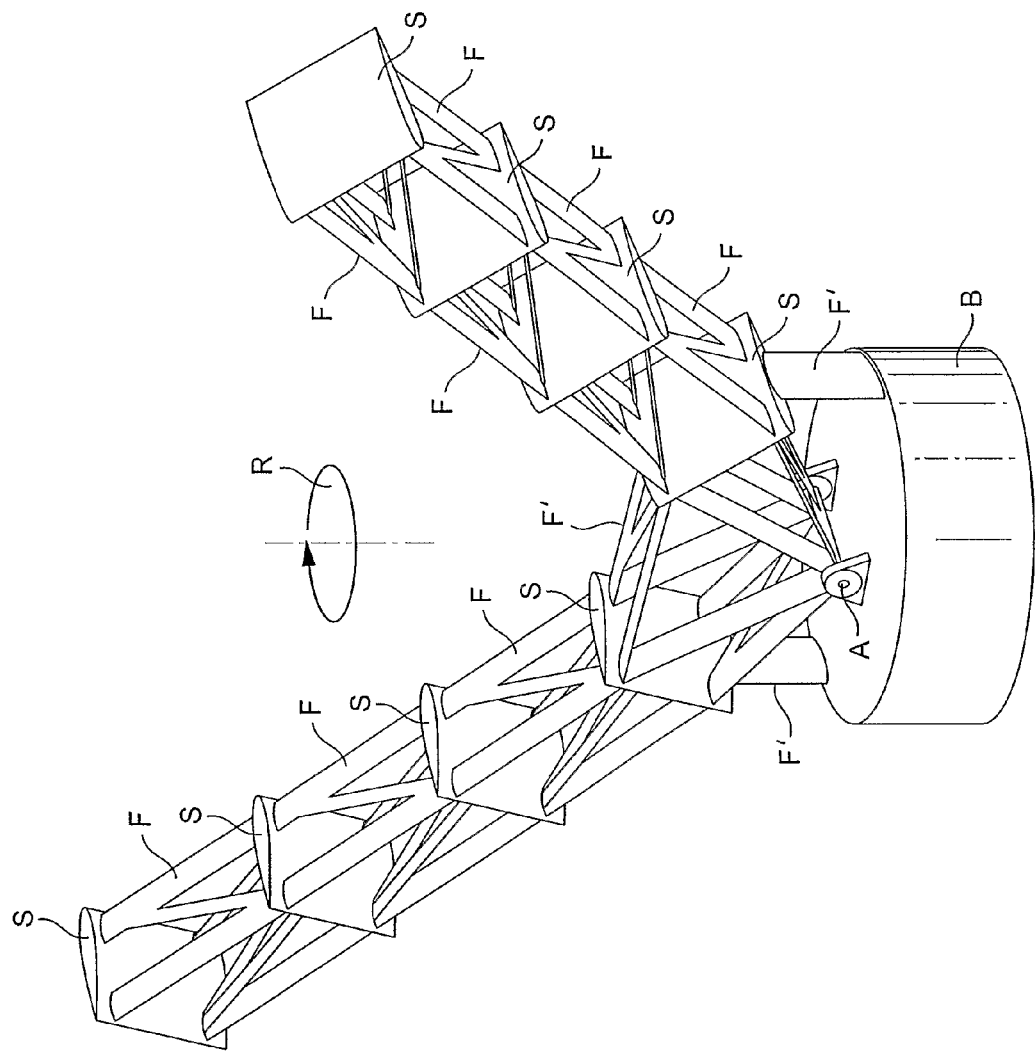
FIG. 3 is a perspective diagrammatic view of an alternative embodiment.
Figure 4:
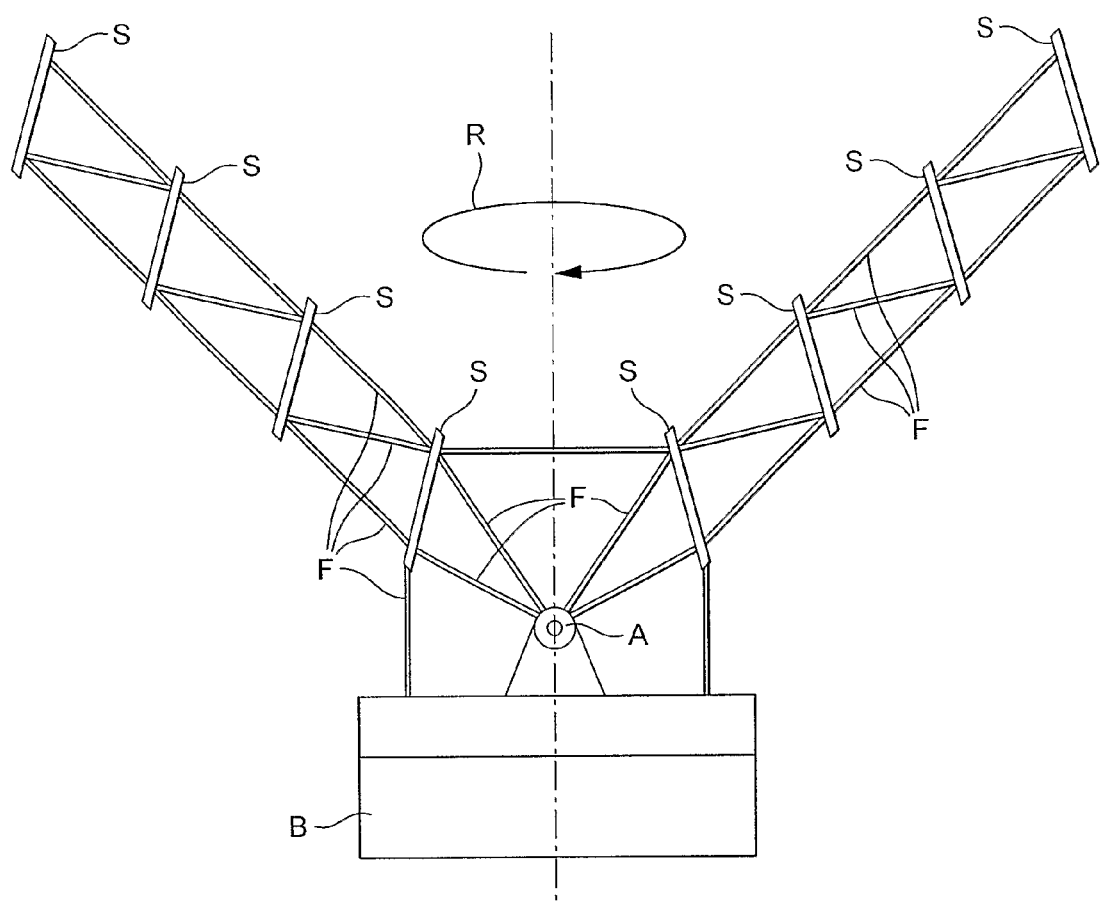
FIG. 4 is a vertical section through the embodiment of FIG. 3.

Referring now to FIGS. 3 and 4, these show a wind turbine apparatus with two arms comprising complex frameworks of struts and ties supporting short aerofoil section blades S.

Each of the struts and ties forming the arms or spars is of aerofoil section to minimise wind resistance. As can be seen, the leading edge of each aerofoil section is in the same circumferential direction looked at around a vertical axis through the centre of the apparatus and when wind blows horizontally past the apparatus, it is therefore caused to rotate in the direction of rotation indicated at R on FIG. 3.

As can be seen easily from FIG. 3, the two arms rest on a generally cylindrical base B. As can be seen from the drawing, the two arms sit pivoted at their respective bases to a pair of mounting lugs so that each can be rotated about a generally horizontal axis indicated at A following disengagement of three of the struts identified as F'. This is useful to enable, e.g., damage to any of the aerofoils caused by bird impact to be repaired.

The base B is mounted on an appropriate bearing system and means are provided to drive a generator directly or indirectly in order to produce electricity when the wind blows and rotates the assembly shown in FIGS. 3 and 4.

Underwater turbine installations may be made in similar fashion, though taking into account the conditions likely to be encountered. By careful design, substantial engineering savings may be made as the effective weight of the rotatable turbine member can be much reduced, e.g. by making the hydrofoil members hollow.

The invention claimed is:

1. A vertical axis turbine comprising:
   a base, and
   a turbine rotor rotatable relative to the base about a vertical axis of rotation; wherein the turbine rotor comprises:
   at least one inclined elongate aerofoil or hydrofoil spar mounted at a lower end thereof to the base and inclined upwardly and outwardly from the vertical axis of rotation, and
   each of said at least one spar having mounted thereto at least one aerofoil or hydrofoil section blade, wherein
   each of said at least one aerofoil or hydrofoil section blade is inclined downwardly and outwardly relative to the vertical axis of rotation, and wherein each of said at least one aerofoil or hydrofoil section blade is angled relative to a respective one of said at least one spar to reduce an overturning moment when the turbine is rotating in a fluid flow.

2. The turbine according to claim 1, wherein each of the at least one aerofoil or hydrofoil section blade is angled relative to a respective one of said at least one spar to minimize an overall overturning moment when the turbine is rotating in a fluid flow.

3. The turbine according to claim 1, wherein the at least one aerofoil or hydrofoil section blade is mounted on the respective spar with its spanwise direction extending at an angle in a range of 90 degrees to 160 degrees, measured from a radially outward horizontal direction in a radial and vertical plane containing a center-line of the respective spar.

4. The turbine according to claim 1 or 3, wherein two or three of said at least one spar are present.

5. The turbine according to claim 1 or 3, wherein one to five of said at least one aerofoil or hydrofoil section blade are present on each of said at least one spar.

6. The turbine according to claim 1 or 3, wherein each of said at least one aerofoil or hydrofoil section blade has an aspect ratio in a range of 2 to 5.

7. The turbine according to claim 1 or 3, wherein at least two of said at least one spar are present, and further comprising a plurality of guy wires connecting each spar to an opposite or adjacent spar.

8. The turbine according to claim 1, wherein inclination of said at least one spar can be varied.

9. The turbine according to claim 8, wherein each of said at least one spar is hinged to a base member for rotation about a horizontal hinge line to vary the inclination thereof.

10. A vertical axis turbine comprising:
    a base, and
    a turbine rotor rotatable relative to the base about a vertical axis of rotation; wherein the turbine rotor comprises:
    two inclined elongate aerofoil or hydrofoil spars mounted at respective lower ends thereof to the base, and being inclined upwardly and outwardly relative to the vertical axis of rotation, and an aerofoil or hydrofoil section blade carried at or near an upper end of a respective one of said spars, wherein each said section blade has a first blade portion extending downwardly and outwardly from the upper end of the respective one of said spars and a second blade portion extending upwardly and inwardly from the upper end of the respective one of said spars.

11. The turbine according to claim 1 or 10 constructed as a wind turbine and wherein each said section blade has an aerodynamic profile with a maximum thickness to chord ratio in a range of 10% to 50%.

12. The turbine according to claim 1 or 10, wherein each said aerofoil or hydrofoil section blade has an angle of mounting to a respective spar, measured from a horizontal line perpendicular to a radial and vertical plane containing a center-line of the respective spar in a normal cross-sectional plane of the section blade, in a range +5 degrees to −5 degrees.

13. The turbine according to claim 1 or 10, wherein each spar present comprises a number of sub-spars constructed to provide a framework arranged to mount at least one said aerofoil section blade.

14. The turbine according to claim 10, further comprising a plurality of guy wires connecting said two spars.

15. The turbine according to claim 10, wherein inclination of said two spars can be varied.

16. The turbine according to claim 15, wherein each of said two spars is hinged to a base member for rotation about a horizontal hinge line to vary inclination thereof.

17. A vertical axis turbine comprising:
a base, and
a rotor mounted on said base for rotation relative thereto about a vertical axis of rotation;
said rotor comprising:
a plurality of spars of aerofoil or hydrofoil section extending upwardly and outwardly relative to said vertical axis of rotation; and
at least one aerofoil or hydrofoil section blade mounted to each of said plurality of spars; wherein
said plurality of spars and said at least one section blade are arranged to optimize an overall rotational couple about the vertical axis of rotation and to minimize an overall overturning moment when rotating under wind or water current loading.

18. An electricity generating installation comprising a turbine according to claim 1, 10 or 17 connected to drive an electrical generator.

19. A method of supplying electricity comprising operating an installation according to claim 18 including steps of:
rotating the turbine in a fluid flow;
generating electricity in an electrical generator driven by the turbine; and
supplying electricity from the electrical generator to a user.

20. A method of operating a vertical axis wind turbine, comprising steps of:
providing a vertical axis turbine comprising:
a base; and
a turbine rotor rotatable relative to the base about a vertical axis of rotation, wherein the turbine rotor comprises:
at least one inclined elongate aerofoil or hydrofoil spar mounted at a lower end thereof to the base and inclined upwardly and outwardly from the vertical axis of rotation, and
each of said at least one spar having mounted thereto at least one aerofoil or hydrofoil section blade, wherein each of said at least one aerofoil or hydrofoil section blade is inclined downwardly and outwardly relative to the vertical axis of rotation;
adjusting each of said at least one aerofoil or hydrofoil section blade at an angle relative to a respective one of said at least one spar to reduce an overturning moment when the turbine is rotating in a fluid flow; and
operating the turbine in a fluid flow which acts to rotate the turbine.

\* \* \* \* \*